(12) United States Patent
Zhuge et al.

(10) Patent No.: US 12,443,786 B2
(45) Date of Patent: Oct. 14, 2025

(54) CHARACTER DISPLAY METHOD AND APPARATUS, ELECTRONIC DEVICE, AND COMPUTER-READABLE STORAGE MEDIUM

(71) Applicant: BEIJING BYTEDANCE NETWORK TECHNOLOGY CO., LTD., Beijing (CN)

(72) Inventors: Jingjing Zhuge, Beijing (CN); Guangyao Ni, Beijing (CN); Yepeng Chen, Beijing (CN); Yanhao Shen, Beijing (CN); Hui Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 247 days.

(21) Appl. No.: 18/245,052

(22) PCT Filed: Aug. 10, 2021

(86) PCT No.: PCT/CN2021/111846
§ 371 (c)(1),
(2) Date: Mar. 13, 2023

(87) PCT Pub. No.: WO2022/083240
PCT Pub. Date: Apr. 28, 2022

(65) Prior Publication Data
US 2025/0094685 A1    Mar. 20, 2025

(30) Foreign Application Priority Data
Oct. 23, 2020 (CN) .......................... 202011143511.0

(51) Int. Cl.
G06T 11/00   (2006.01)
G06F 40/109  (2020.01)

(52) U.S. Cl.
CPC .......... *G06F 40/109* (2020.01); *G06T 11/001* (2013.01)

(58) Field of Classification Search
CPC ........ G09G 5/24; G09G 5/243; G06F 40/109; G06T 11/001; G06T 11/60
See application file for complete search history.

(56) References Cited

U.S. PATENT DOCUMENTS
2019/0361528 A1   11/2019   Jung et al.

FOREIGN PATENT DOCUMENTS
CN   101930725 A   12/2010
CN   106095240 A   11/2016
(Continued)

OTHER PUBLICATIONS
English Translation of CN107066440 (Google Patents) (Year: 2017).*
(Continued)

*Primary Examiner* — Antonio A Caschera

(57) ABSTRACT

Provided are a character display method and apparatus, an electronic device, and a computer-readable storage medium. The method includes: obtaining a to-be-displayed character; determining a type of the to-be-displayed character; determining a display origin of the to-be-displayed character based on the type of the to-be-displayed character; displaying, at the display origin of the to-be-displayed character, the to-be-displayed character in a first manner in response to the to-be-displayed character being of a first type; and displaying, at the display origin of the to-be-displayed character, the to-be-displayed character in a second manner in response to the to-be-displayed character being of a second type.

17 Claims, 7 Drawing Sheets

(56) References Cited

FOREIGN PATENT DOCUMENTS

| | | | |
|---|---|---|---|
| CN | 107066440 A | 8/2017 |
| CN | 108920433 A | 11/2018 |
| CN | 109213485 A | 1/2019 |
| CN | 109725862 A | 5/2019 |
| CN | 110609981 A | 12/2019 |
| CN | 112256175 A | 1/2021 |

OTHER PUBLICATIONS

Notice of Grant Decision issued Jun. 29, 2023 in Chinese Application. No. 202011143511.0, with English translation (7 pages).
Search Report mailed Nov. 10, 2021 in PCT/CN2021/111846, English translation (9 pages).
First Office Action issued Sep. 3, 2021 in CN Appl. No. 202011143511.0, English translation (22 pages).
Second Office Action Issued Apr. 20, 2022 in CN Appl. No. 202011143511.0, English translation (17 pages).
Rejection Decision issued Dec. 27, 2022 in CN Appl. No. 202011143511.0, English translation (16 pages).
European Search Report for EP Patent Application No. 21881659.3, Issued on Feb. 16, 2024, 8 pages.

\* cited by examiner

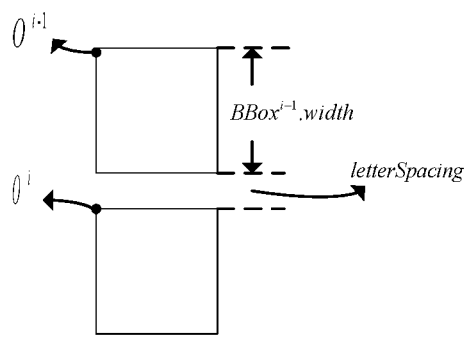
FIG. 5e
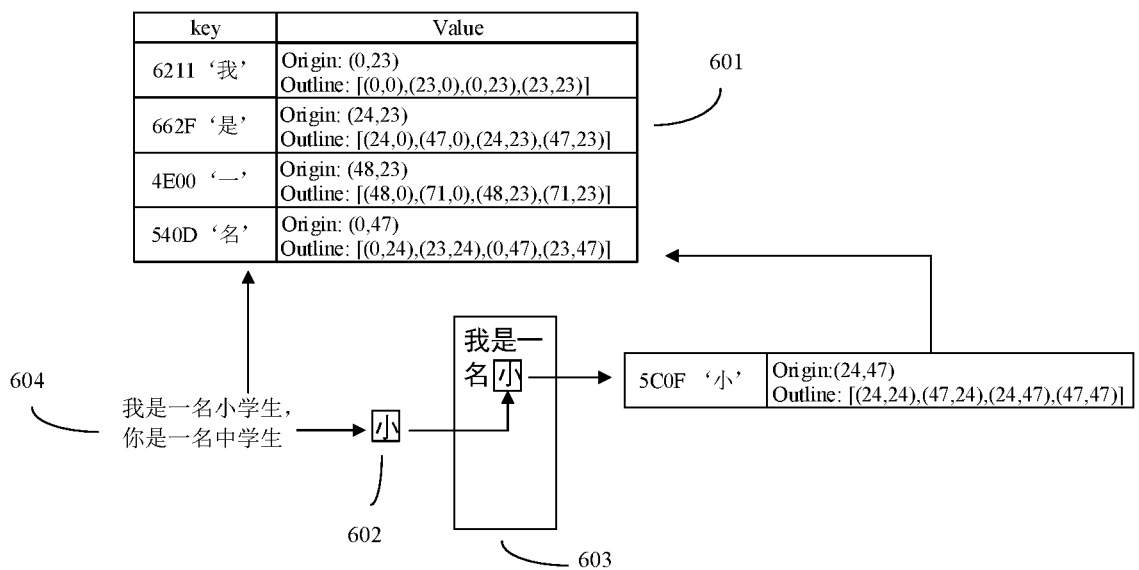
FIG. 6
| Lua是巴西里约热内卢天主教<br>大学(Pontifical Catholic<br>University of Rio de<br>Janeiro)的一个研究小组开<br>发出来的 | ⟹ | Lua是巴西里约热内卢天主教大学(Pontifcal<br>ChUversyRdeJ)的一个研究小组开发出来的 |
To-be-displayed text　　　　　　　　　　Character texture atlas
FIG. 7a

CHARACTER DISPLAY METHOD AND APPARATUS, ELECTRONIC DEVICE, AND COMPUTER-READABLE STORAGE MEDIUM

The present application claims priority to Chinese Patent Application No. 202011143511.0, entitled "CHARACTER DISPLAY METHOD AND APPARATUS, ELECTRONIC DEVICE, AND COMPUTER-READABLE STORAGE MEDIUM" and filed on Oct. 23, 2020, the entire disclosure of which is incorporated herein by reference.

FIELD

The present disclosure relates to the field of character processing, and more particularly, to a character display method, a character display apparatus, an electronic device, and a computer-readable storage medium.

BACKGROUND

With the continuous development of computer technology, which triggers the continuous progress of digital information and the accelerated update of mobile devices, mobile terminal devices such as tablet PC, cell phones, e-readers are widely popularized, and digital reading methods develop rapidly, such that more and more people choose mobile devices such as cell phones to obtain and learn information. The character is also one of the most common ways for people to obtain information. Therefore, displaying characters on mobile terminals is one of the basic functions of mobile terminals.

When displaying characters, conventional mobile terminals generally display them in pre-determined format. For example, the lyrics displayed in music applications, subtitles displayed in video applications, etc., are generally displayed in fixed formats, or several kinds of fixed formats are provided for users to choose. Therefore, users cannot flexibly control the format of characters that are drawn on the screen.

SUMMARY

This summary is provided to introduce concepts in a brief form, and these concepts will be described in detail later in the section of detailed description. This summary is neither intended to identify key or essential features of the claimed technical solutions, nor intended to limit the scope of the claimed technical solutions.

In a first aspect, a character display method is provided according to embodiments of the present disclosure. The character display method includes: obtaining a to-be-displayed character; determining a type of the to-be-displayed character; determining a display origin of the to-be-displayed character based on the type of the to-be-displayed character; displaying, at the display origin of the to-be-displayed character, the to-be-displayed character in a first manner in response to the to-be-displayed character being of a first type; and displaying, at the display origin of the to-be-displayed character, the to-be-displayed character in a second manner in response to the to-be-displayed character being of a second type.

In a second aspect, a character display apparatus is provided according to embodiments of the present disclosure. The character display apparatus includes: a character obtaining module configured to obtain a to-be-displayed character; a character type determining module configured to determine a type of the to-be-displayed character; a display origin determining module configured to determine a display origin of the to-be-displayed character based on the type of the to-be-displayed character; and a display module configured to display, at the display origin of the to-be-displayed character, the to-be-displayed character in a first manner in response to the to-be-displayed character being of a first type, and display, at the display origin of the to-be-displayed character, the to-be-displayed character in a second manner in response to the to-be-displayed character being of a second type.

In a third aspect, an electronic device is provided according to embodiments of the present disclosure. The electronic device includes: at least one processor; and a memory in a communication connection with the at least one processor. The memory has instructions executable by the at least one processor stored thereon. The instructions, when executed by the at least one processor, cause the at least one processor to perform any character display method in the above first aspect.

In a fourth aspect, a non-transitory computer-readable storage medium is provided according to embodiments of the present disclosure. The non-transitory computer-readable storage medium has computer instructions stored thereon. The computer instructions are configured to cause a computer to perform any character display method of the above first aspect.

According to the embodiments of the present disclosure, the character display method and apparatus, the electronic device, and the computer-readable storage medium are disclosed. The character display method includes: obtaining a to-be-displayed character; determining a type of the to-be-displayed character; determining a display origin of the to-be-displayed character based on the type of the to-be-displayed character; displaying, at the display origin of the to-be-displayed character, the to-be-displayed character in a first manner in response to the to-be-displayed character being of a first type; and displaying, at the display origin of the to-be-displayed character, the to-be-displayed character in a second manner in response to the to-be-displayed character being of a second type. With the above method, characters of different types are displayed in different manners by determining the type of the to-be-displayed character. Therefore, it is possible to display the to-be-displayed characters in different manners under unified typesetting, which solves a technical problem of inflexible control of character drawing in the related art.

BRIEF DESCRIPTION OF THE DRAWINGS

The above and other features, advantages, and aspects of embodiments of the present disclosure will become more apparent in conjunction with the accompanying drawings and with reference to the following specific embodiments. Throughout the drawings, same or similar elements are denoted by same or similar reference numerals. It should be understood that the drawings are schematic, and elements and components are not necessarily drawn to scale.

FIG. 5b to FIG. 5e are schematic diagrams showing four cases for determining a display origin of a to-be-displayed character according to embodiments of the present disclosure.

FIG. 6 is a schematic diagram of generating a character texture atlas according to an embodiment of the present disclosure.

FIG. 7a and FIG. 7b are each a schematic diagram showing an application scenario for displaying to-be-displayed characters in a to-be-displayed text using a character display method according to an embodiment of the present disclosure.

DETAILED DESCRIPTION

Figure 1:
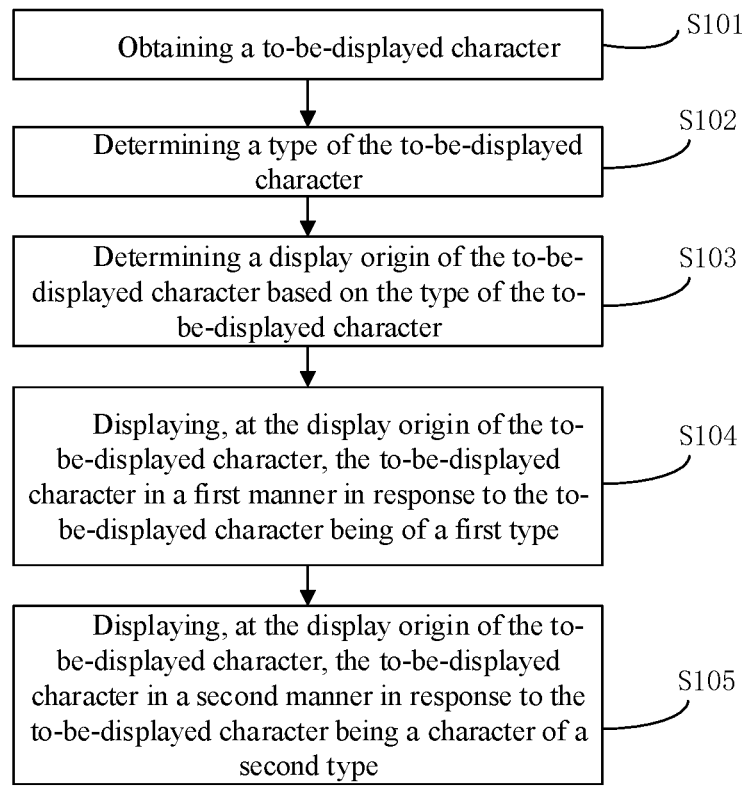
FIG. 1 is a schematic flowchart of a character display method according to an embodiment of the present disclosure.

Embodiments of the present disclosure will be described in more detail below with reference to the accompanying drawings. Although some embodiments of the present disclosure are shown in the drawings, it should be understood that the present disclosure can be implemented in various forms and should not be construed as being limited to the embodiments set forth herein. These embodiments are provided to facilitate a more thorough and complete understanding of the present disclosure. It should be understood that the accompanying drawings and embodiments of the present disclosure are only used for exemplary purposes, rather than to limit the protection scope of the present disclosure.

Names of messages or information exchanged between apparatuses in the embodiments of the present disclosure are only used for illustrative purposes, and are not intended to limit the scope of these messages or information FIG. 1 is a flowchart illustrating a character display method according to an embodiment of the present disclosure. The character display method according to this embodiment may be performed by a character display apparatus. The character display apparatus may be implemented as software or a combination of software and hardware, and may be integrated in a device in a character display system, such as a character display server or a character display terminal device. As illustrated in FIG. 1, the method includes actions at blocks S101 to S105.

At block S101, a to-be-displayed character is obtained.

Here, the to-be-displayed character is a character in a to-be-displayed text. The to-be-displayed text includes a plurality of to-be-displayed characters. In the present disclosure, the to-be-displayed text includes a character of a first type and a character of a second type. For example, the character of the first type is Chinese and the character of the second type is a character other than Chinese, such as English and other characters, etc.

In some embodiments, the action of obtaining the to-be-displayed character includes receiving the to-be-displayed character via a human-computer interaction interface. The human-computer interaction interface includes an input device such as a keyboard, a mouse, a touch screen, etc. A user enters the to-be-displayed character through the human-computer interaction interface.

In some embodiments, the action at block S101 includes: obtaining a to-be-displayed text; and splitting characters in the to-be-displayed text to obtain at least one to-be-displayed character.

In some embodiments, the operation of splitting the characters in the to-be-displayed text to obtain the at least one to-be-displayed character includes: obtaining a first code of the to-be-displayed text; and splitting the to-be-displayed text based on the first code to obtain the at least one to-be-displayed character.

Here, the first code is capable of distinguishing different types of to-be-displayed characters, such as a code of the character of the first type and a code of the character of the second type. For example, the first code includes Unicode. A coding interval of Unicode for Chinese characters is from 0x4E00 to 0x9FFF. When the first code of the to-be-displayed character is in this interval, it is determined that the to-be-displayed character is a Chinese character, i.e., the character of the first type; otherwise, it is determined that the to-be-displayed character is a character of another type, such as an English letter or other punctuation marks, i.e., the character of the second type.

At block S102, a type of the to-be-displayed character is determined.

In some embodiments, the action at block S102 includes: obtaining a first code of the to-be-displayed character; and determining the to-be-displayed character to be of a first type or of a second type based on the first code of the to-be-displayed character.

When to-be-displayed characters are received via the human-computer interaction interface, a character type of each to-be-displayed character may be determined by means of the first code each time the to-be-displayed character is received. When the to-be-displayed character is obtained by splitting the to-be-displayed text, each character in the to-be-displayed text is traversed to obtain the first code of the character. As described in the above action at block S101, the first code includes Unicode and the coding interval of Unicode for Chinese characters is from 0x4E00 to 0x9FFF. Therefore, the to-be-displayed character may be determined, through the Unicode, to be of the first type or of the second type, i.e., Chinese or English or other punctuation marks other than Chinese, etc.

Figure 2:
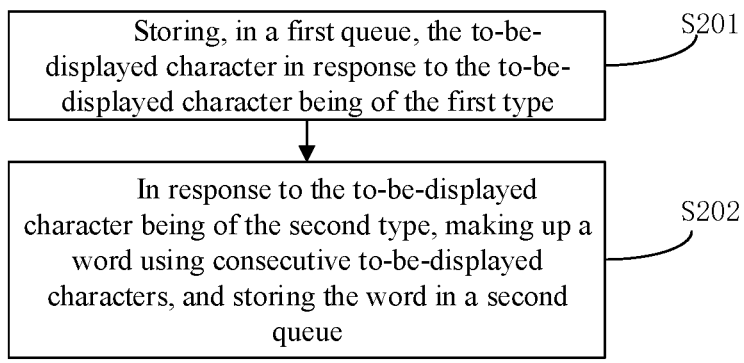
FIG. 2 is a further schematic flowchart of the character display method according to an embodiment of the present disclosure.

In some embodiments, as illustrated in FIG. 2, the character display method further includes actions at blocks S201 and S202 subsequent to the action at block S102.

At block S201, the to-be-displayed character is stored in a first queue in response to the to-be-displayed character being of the first type.

At block 202, in response to the to-be-displayed character being of the second type, a word is made up using consecutive to-be-displayed characters, and stored in a second queue.

For example, the to-be-displayed text is "Lua 是巴西里约热内卢天主教大学 (Pontifical Catholic University of Rio de Janeiro)的一个研究小组并发出来的" (which means Lua was developed by a research group at Pontifical Catholic University of Rio de Janeiro, Brazil), in which Chinese characters are identified as characters of the first type, and English letters, brackets, and spaces are identified as characters of the second type. A queue arrChinese for storing Chinese characters is initialized. Each Chinese character in the to-be-displayed text is stored in the queue arrChinese as a string to obtain arrChinese: {'是' '巴' '西' . . . }. English words are made up by consecutive English letters in the original text and stored in another alphabetic queue arrOther. Other characters than English letters such as punctuations, brackets, spaces, etc., are also stored in the queue arrOther to obtain arrOther: {'Lua' '(' 'Pontifical' ' ' 'Catholic' . . . ). In this way, each English word may be treated as a whole in subsequent typesetting, which will be described in detail in the subsequent description and will be omitted here.

At block S103, a display origin of the to-be-displayed character is determined based on the type of the to-be-displayed character.

Figures 3, 4:
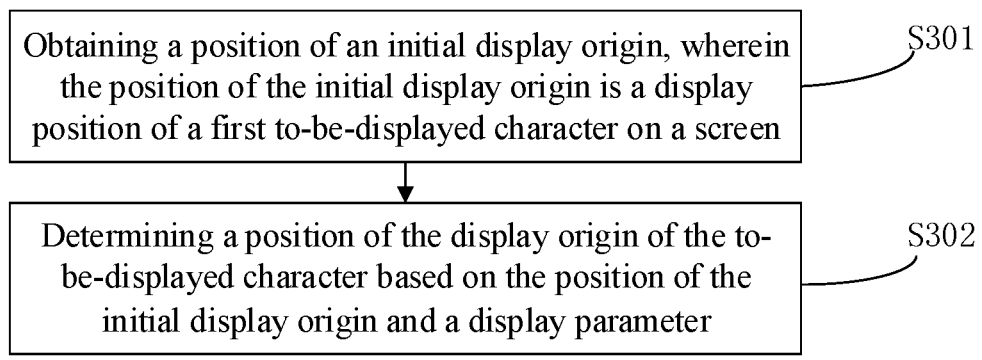
FIG. 3 is a further another schematic of the character display method according to an embodiment of the present disclosure.
FIG. 4 is a further schematic flowchart of the character display method according to an embodiment of the present disclosure.

In some embodiments, as illustrated in FIG. 3, the action at block S103 includes actions at blocks S301 and S302.

At block S301, a position of an initial display origin is obtained. The position of the initial display origin is a display position of a first to-be-displayed character on a screen.

At block S302, a position of the display origin of the to-be-displayed character is determined based on the position of the initial display origin and a display parameter.

Here, the position of the initial display origin is a predetermined position on the screen, and the predetermined position is the display position of the first to-be-displayed character among characters displayed on the screen. The position of the display origin of the to-be-displayed character is a position, on the screen, of the display origin of the to-be-displayed character. Each to-be-displayed character includes a display origin configured to indicate a position of the to-be-displayed character. For example, if a position of a point on the screen is (1,1), and if the display origin of the to-be-displayed character is set at the position (1,1), then the to-be-displayed character is displayed at the position (1,1) of the screen.

In some embodiments, the character display method further includes, prior to the action at block 103: receiving a display parameter.

For example, the display parameter in the present disclosure includes one or more of the initial display origin of the to-be-displayed character on the screen, a height of a character box, a width of the character box, a character size, an alignment manner, a line width, a character spacing, or a line spacing.

In some embodiments, the display parameter is a user-inputted parameter.

For example, the initial display origin is received in a first interaction manner. For example, coordinates of the initial display origin are received through a touch signal generated by the user clicking on the screen. Coordinates of a position, clicked by the user, on the screen are the coordinates of the initial display origin.

For example, the line width, the character spacing, and the line spacing may be received in a second interaction manner. For example, specific values of the line width, the character spacing, and the line spacing that are inputted by the user are received via an input box.

For example, the alignment manner is received in a third interaction manner. For example, a corresponding alignment manner is selected through a drop-down menu or a selection button.

It should be understood that the above interaction manners are examples only. The interaction manners in the present disclosure are not limited to any of these examples. The above display parameters are also examples only and are not intended to limit the present disclosure.

It should be understood that default parameter values may be set for the above display parameters. When the user does not input any display parameter, the received display parameter has the default parameter value.

In some embodiments, as illustrated in FIG. 4, the action at block S302 further includes an action at block S401.

At block S401, the display origin of the to-be-displayed character is determined based on a type of a previous character, a display origin of the previous character, the display parameter, and the type of the to-be-displayed character.

In some embodiments, during the obtaining of the to-be-displayed character, the character display method further includes: splitting a to-be-displayed text to obtain each to-be-displayed character, setting an index for each to-be-displayed character, and indexing and storing in an index list each to-be-displayed character in accordance with an order of the to-be-displayed character in the to-be-displayed text.

In some embodiments, the action of determining the position of the display origin of the to-be-displayed character based on the position of the initial display origin and the display parameter includes: identifying a display origin of each to-be-displayed character by starting from a to-be-displayed character having an index of 0; setting, in response to the index of the to-be-displayed character being 0, i.e., the to-be-displayed character being a first character in the to-be-displayed text, the display origin of the to-be-displayed character on the screen as the initial display origin; or determining, in response to the index of the to-be-displayed character not being 0, the display origin of the to-be-displayed character based on the type of the previous character, the display origin of the previous character, the display parameter, and the type of the to-be-displayed character.

A position of a currently-obtained to-be-displayed character in the to-be-displayed text may be determined through the index of the to-be-displayed character. During the obtaining of the to-be-displayed character at block S101, each to-be-displayed character in the to-be-displayed text may be traversed and provided with an index. For example, the index is represented by i. Afterwards, in the action at block S302, the display origin of each to-be-displayed character is identified by starting from the to-be-displayed character having the index of 0. In response to the index of the to-be-displayed character being 0, i.e., the to-be-displayed character being the first character in the to-be-displayed text, the display origin of the to-be-displayed character on the screen is directly set as the initial display origin. In response to the index of the to-be-displayed character not being 0, the display origin of the to-be-displayed character i is determined based on the type of the to-be-displayed character i, the type of the previous character (i-1), the display origin of the previous character, and the display parameter.

Figure 5A:
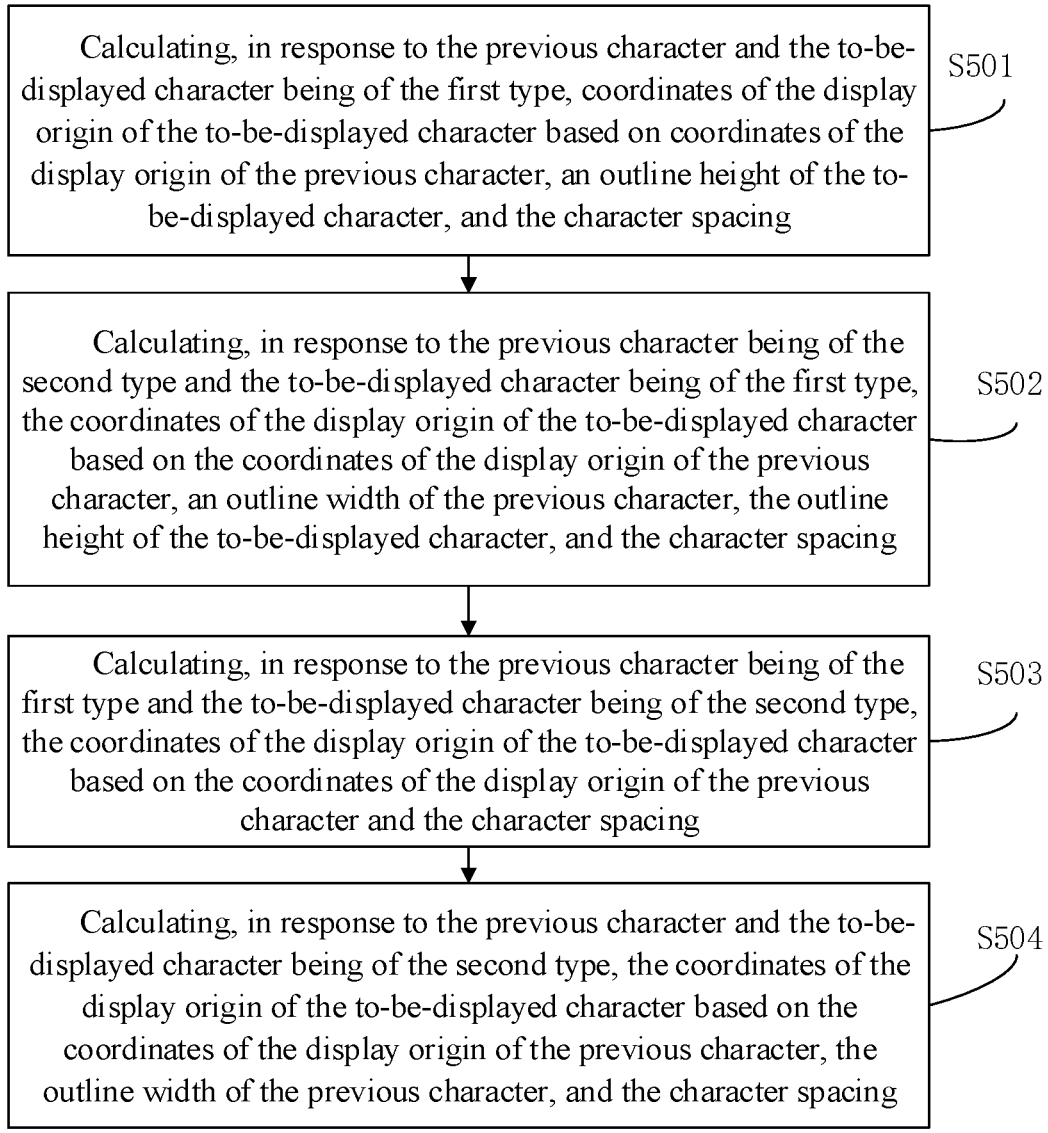
FIG. 5a is a further schematic flowchart of the character display method according to an embodiment of the present disclosure.

In some embodiments, as illustrated in FIG. 5a, the action at block S401 includes actions at blocks S501 to S504.

At block S501, coordinates of the display origin of the to-be-displayed character are calculated, in response to the previous character and the to-be-displayed character being of the first type, based on coordinates of the display origin of the previous character, an outline height of the to-be-displayed character, and the character spacing.

At block S502, the coordinates of the display origin of the to-be-displayed character are calculated, in response to the previous character being of the second type and the to-be-displayed character being of the first type, based on the coordinates of the display origin of the previous character, an outline width of the previous character, the outline height of the to-be-displayed character, and the character spacing.

At block S503, the coordinates of the display origin of the to-be-displayed character are calculated, in response to the previous character being of the first type and the to-be-displayed character being of the second type, based on the coordinates of the display origin of the previous character and the character spacing.

At block S504, the coordinates of the display origin of the to-be-displayed character are calculated, in response to the previous character and the to-be-displayed character being of the second type, based on the coordinates of the display origin of the previous character, the outline width of the previous character, and the character spacing.

For the convenience of describing the above actions, the to-be-displayed character is denoted as an i-th character in the to-be-displayed text (e.g., index i), the display origin of the to-be-displayed character on the screen is denoted as $O^i$, $A^i$ represents a position of an origin of the to-be-displayed character in the character texture atlas, and $BBox^i$ represents an outline of the to-be-displayed character in the character texture atlas. The initial display origin is denoted as $O^0=(X_0, Y_0)$. In this optional embodiment, the display origin is a vertex of a lower left corner of the outline of a texture of the to-be-displayed character.

The actions at blocks S501 to S504 describe a process of calculating a position of a display origin of each to-be-displayed character in a case where vertical typesetting is applied and the character of the second type is rotated by 90°.

Each to-be-displayed character in the to-be-displayed text is traversed to determine a case in the actions at blocks S501 to S504 that the to-be-displayed character meets. Then, a corresponding action is performed in accordance with a corresponding case to obtain the display origin of the to-be-displayed character.

Figure 5B:
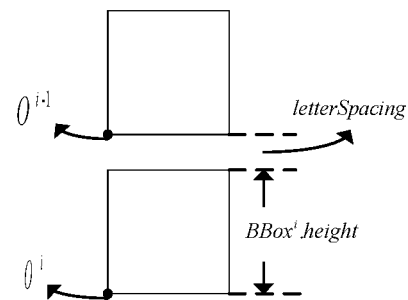

In the action at block S501, if both the previous character i-1 and the to-be-displayed character i are characters of the first type, the coordinates of the display origin of the to-be-displayed character are calculated using the following formula (1):

$$O^i \cdot y = O^{i-1} \cdot y + BBox^i \cdot height + letterSpacing \quad (1)$$
$$O^i \cdot x = O^{i-1} \cdot x,$$

where $O^i.y$ and $O^i.x$ represent a Y-axis coordinate and an X-axis coordinate of the display origin of the to-be-displayed character, respectively; $O^{i-1}.y$ and $O^{i-1}.x$ represent a Y-axis coordinate and an X-axis coordinate of the display origin of the previous character, respectively; $BBox^i.height$ represents an outline height of the texture of the to-be-displayed character, hereinafter referred to as the outline height, the outline height being smaller than or equal to a font size fontSize of the character; and letterSpacing represents the character spacing in the display parameter. In this optional embodiment, the action at block S501 corresponds to a case where both the to-be-displayed character and the previous character are Chinese characters, the characters are typeset vertically, and the Chinese characters are displayed at a normal angle. Therefore, the display origin of the to-be-displayed character is calculated based on the outline height of the character and the character spacing. The typesetting in the case corresponding to the action at block S501 is illustrated in FIG. 5b.

Figure 5C:
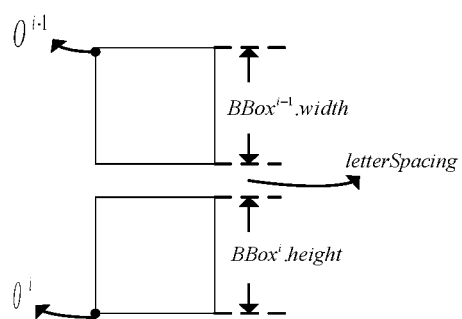

In the action at block S502, if the previous character i-1 is a character of the second type and the to-be-displayed character i is a character of the first type, the coordinates of the display origin of the to-be-displayed character are calculated using the following formula (2):

$$O^i \cdot y = O^{i-1} \cdot y + BBox^{i-1} \cdot width + BBox^i \cdot height + letterSpacing \quad (2)$$
$$O^i \cdot x = O^{i-1} \cdot x,$$

where $BBox^{i-1}.width$ represents the outline width of the previous character. In this optional embodiment, the non-Chinese character needs to be rotated by 90°, the rotation of which is a 90° clockwise rotation with an origin of a texture of the character as a rotation axis. Therefore, when the previous character is a character of the second type, the previous character needs to be rotated. After the rotation, it is necessary to add the outline width of the previous character to obtain the Y-axis coordinate of the to-be-displayed character. The typesetting in a case corresponding to the action at block S502 is illustrated in FIG. 5c.

In the action at block S503, if the previous character i-1 is a character of the first type and the to-be-displayed character i is a character of the second type, the coordinates of the display origin of the to-be-displayed character are calculated using the following formula (3):

$$O^i \cdot y = O^{i-1} \cdot y + letterSpacing \quad (3)$$
$$O^i \cdot x = O^{i-1} \cdot x.$$

Figure 5D:
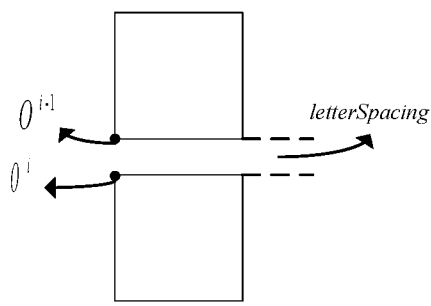

In this optional embodiment, the previous character is a Chinese character, which undergoes no rotation and has the display origin corresponding to the lower left corner of the outline of the texture of the previous character; and the to-be-displayed character is a non-Chinese character, which needs to undergo a 90° rotation around an origin of the texture of the to-be-displayed character. After the rotation of the to-be-displayed character, only one character spacing is present between an upper display origin and a lower display origin. Therefore, in this case, the coordinates of the display origin of the to-be-displayed character can be calculated only based on the character spacing and the coordinates of the display origin of the previous character. The typesetting in a case corresponding to the action at block S503 is illustrated in FIG. 5d.

In the action at block S504, if both the previous character i-1 and the to-be-displayed character i are characters of the second type, the coordinates of the display origin of the to-be-displayed character are calculated using the following formula (4):

$$O^i \cdot y = O^{i-1} \cdot y + BBox^{i-1} \cdot width + letterSpacing \quad (4)$$
$$O^i \cdot x = O^{i-1} \cdot x.$$

In this optional embodiment, both the previous character and the to-be-displayed character need to be rotated by 90°. Therefore, a distance between the two display origins of the previous character and the to-be-displayed character after the rotation is equal to a sum of the outline width of the previous character and the character spacing. Therefore, the coordinates of the display origin of the to-be-displayed character can be calculated using the formula (4). The typesetting in a case corresponding to the action at block S504 is illustrated in FIG. 5e.

In some embodiments, the method further includes: re-determining, in response to a position of a lower border of the to-be-displayed character exceeding a maximum threshold, the position of the display origin of the to-be-displayed character based on the type of the to-be-displayed character, a display position of the previous character, and the display parameter.

In the above optional embodiment, the display parameter further includes a maximum height Maxheight of each column. Thus, a bottom border of each column may be determined based on the initial display origin and the maximum height. After the position of the display origin of the to-be-displayed character is calculated, whether the position of the lower border of the to-be-displayed character exceeds the bottom border, i.e., whether a Y-axis coordinate of the lower border exceeds the maximum threshold, is determined. The position of the lower border of the to-be-displayed character is a Y-axis coordinate of a lower border of the outline of the to-be-displayed character. In this optional embodiment, the display origin of the to-be-displayed character is located at a position of a lower left vertex of the outline of the to-be-displayed character. Therefore, the position of the lower border of the to-be-displayed character is the Y-axis coordinate of the display origin of the to-be-displayed character. If the position of the lower border of the to-be-displayed character does not exceed the maximum threshold, the position of the display origin of the to-be-displayed character is determined, and then the method proceeds to calculate a position of a display origin of a next to-be-displayed character in accordance with the actions at blocks S501 to S504. If the position of the lower border of the to-be-displayed character exceeds the maximum threshold, the position of the display origin of the to-be-displayed character is re-determined based on the type of the to-be-displayed character, the display position of the previous character, and the display parameter, i.e., a column change operation is performed.

In some embodiments, the action of re-determining the position of the display origin of the to-be-displayed character based on the type of the to-be-displayed character, the display position of the previous character, and the display parameter includes: calculating, in response to the to-be-displayed character being of the first type or being a first character in a word made up by characters of the second type, coordinates of the display origin of the to-be-displayed character based on coordinates of the display origin of the previous character, a font size, and a line spacing; and in response to the to-be-displayed character being of the second type and not being a first character in a word made up by characters of the second type, setting the to-be-displayed character as the first character in the word, and calculating the coordinates of the display origin of the to-be-displayed character based on coordinates of a display origin of a previous character of the first character, the font size, and the line spacing.

Here, the action of setting the to-be-displayed character as the first character in the word includes: setting the index of the to-be-displayed character as an index of the first character in the word.

During the column change operation, two cases exist. In one case, the to-be-displayed character is a character of the first type, e.g., Chinese, or the to-be-displayed character is a first character in a word made up by characters of the second type, e.g., a first letter in an English word. In this case, it is only necessary to perform the column change operation. That is, in this case, the to-be-displayed character may be used as a first character in a next vertical line. In this case, the position of the display origin of to-be-displayed character is calculated using the following formula:

$$O^i \cdot x = O^{i-1} \cdot x - fontSize - lineSpacing \quad (5)$$
$$O^i \cdot y = Y_0,$$

where fontSize represents the font size, and lineSpacing represents the line spacing. The above formula (5) defines a calculation method for the position of the display origin after a leftward column change. Since display origins of characters in each column have the same X-axis coordinate, formula (5) is to update the display origin of the to-be-displayed character to the position of the display origin of a first character in a next column.

The other case of the column change operation is that the to-be-displayed character is a character of the second type and is not a first character in a word made up by characters of the second type. For example, the word made up by the characters of the second type is "Catholic", and the to-be-displayed character is "t". Therefore, since "Catholic" is a complete word, it is inappropriate to directly update "t" to a position of a first character of a next column. Therefore, the index of the character "t" needs to be reset to an index of the first letter "C" of the word, such that the entire word can be wrapped to the next column. In this case, the second queue arrOther mentioned above is used. The word containing the to-be-displayed character is denoted as arrOther [k], i.e., a k-th element in the queue arrOther. The traversal index is reset to i=arrOther [k][0]. That is, the index i of the to-be-displayed character is reset to an index of a 0-th character in the k-th element of the queue arrOther. Then, the above formula (5) is used to calculate a position of the first letter of the word after the wrapping. Thereafter, the calculation of a display origin of each to-be-displayed character in the next column proceeds further from the to-be-displayed character i.

The above operations are repeated until the display origin of each to-be-displayed character in the to-be-displayed text is determined.

It should be understood that the above further limitation of the action at block S402 is only an example describing a scheme in which the to-be-displayed characters in the to-be-displayed text are typeset vertically to the left, the Chinese characters are displayed normally, and the non-Chinese characters are displayed after being rotated by 90°. The present disclosure does not limit a specific form of typesetting. Any typesetting manner can be applied to the present disclosure.

At block S104, the to-be-displayed character is displayed at the display origin of the to-be-displayed character in a first manner in response to the to-be-displayed character being of the first type.

In some embodiments, the first manner is to display the texture of the to-be-displayed character at the position of the display origin of the to-be-displayed character, without other processing.

At block S105, the to-be-displayed character is displayed at the display origin of the to-be-displayed character in a second manner in response to the to-be-displayed character being of the second type.

The first manner and the second manner have been described in the above-mentioned actions at blocks S501 to S504 and thus a detailed description thereof will be omitted here.

In some embodiments, the second manner is to display the to-be-displayed character at the position of the display origin of the to-be-displayed character after rotating the to-be-displayed character.

In some embodiments, the character display method further includes, subsequent to the action at block S103: obtaining a character texture of the to-be-displayed character from a character texture atlas. The first manner is to display the character texture at the position of the display origin of the to-be-displayed character. The second manner is to display the character texture at the position of the display origin of the to-be-displayed character after rotating the character texture by a predetermined angle. The character texture atlas is a file in which the texture of the to-be-displayed character is saved. The texture of the character is a texture map generated based on a predetermined standard specification.

Here, the character texture atlas is generated by: obtaining a single character; generating, in response to an absence of the single character in the character texture atlas, a texture of the single character based on a font attribute of the single character; and drawing the texture into the character texture atlas.

In some embodiments, the action of obtaining the single character includes: obtaining a single character from an index list in order, the index list being used to index, after the single character is obtained by splitting a to-be-displayed text, the single character in accordance with an order of the single character in the to-be-displayed text, and store the single character; checking whether the single character is already included in a character mapping relationship table; and in response to the single character being already included in the character mapping relationship table, obtaining a next single character from the index list and checking whether the next single character is already included in the character mapping relationship table until the single character is not included in the character mapping relationship table, wherein the character mapping relationship table saves a correspondence between single characters and textures in the character texture atlas.

In some embodiments, in the above action, the to-be-displayed text is obtained first, and after the singe character is obtained by splitting the to-be-displayed text, the single character is indexed and stored, in the index list, in accordance with an order of the single character in the to-be-displayed text.

The single character is obtained from the index list in order; a check is made in the character mapping relationship table as to whether the single character is already included in this table; if the single character is already included in the character mapping relationship table, a next single character is then obtained from the index list, and a check is made in the character mapping relationship table as to whether the next single character is already included in the table already until the single character is not included in the character mapping relationship table. The character mapping relationship table saves the correspondence between single characters and textures in the character texture atlas. For example, each item in the character mapping relationship table is a key-value pair, in which the key is a Unicode of a single character, and the value corresponding to the key is a position of a texture of the single character in the character texture atlas.

Specifically, the single character is converted into a Unicode form, and searching is made in the character mapping relationship table as to whether there is a key corresponding to a Unicode of the single character. If yes, a next single character is then extracted from the index list, and the above conversion and searching are performed. If no, indicating that there is no texture of the single character in the character texture atlas, then the texture of the single character is generated based on a predetermined font attribute, and the texture is drawn into a first vacant site of a character texture atlas canvas. The font attribute includes a font size, a font style, etc. The vacant site is a vacant site in a storage space corresponding to the character texture atlas canvas and is configured to store a texture map of a character. In an example, vacant sites are arranged sequentially in lines. When no vacant site is available in a current line on the canvas, the drawing is conducted after a line feed.

After the drawing, a texture position of the character texture in the character texture atlas is obtained. For example, the texture position is represented by coordinates of an origin of the character texture in the character texture atlas and coordinates of four vertices of the outline; and a key-value pair of a Unicode of the single character and the position of the character texture is generated in the character mapping relationship table.

FIG. 6 is an example showing a process for generating a character texture in the character texture atlas. As illustrated in FIG. 6, a to-be-displayed text 604 includes single characters "我是一名小学生 , 你是一名中学生 " (which means "I am an elementary school student and you are a secondary school student"). When it is traversed to the character "小 ", the character "小 " is converted to a corresponding Unicode 5C0F, and a check is made in a character mapping relationship table 601. In response to an absence of the Unicode for "小 " in the character mapping relationship table 601, a texture 602 of the character "小 " is generated based on the predetermined font attribute. Then, the texture of "小 " is drawn into a first vacant site in a character texture atlas 603, and a position of the character texture in the character texture atlas 603 is obtained: origin: (24,47); outline: [(24, 24), (47,24), (24,47), (47,47)]. The Unicode 5C0F of "小 " and the position of "小 " in the character texture atlas are inserted as a key-value pair into the character mapping relationship table 601. When it is traversed to a character "是 " in a 2-nd line of the to-be-displayed text, since the texture of "是 " is already included in the character mapping relationship table 601, the character "是 " in the 2-nd line is skipped and a next character " . " is traversed. After each character in the to-be-displayed text has been traversed, a texture of each character in the to-be-displayed text is drawn into the character texture atlas, and a same texture is drawn only once. It can be understood that different character texture atlases may be generated for different to-be-displayed texts, or only one character texture atlas may be generated for all to-be-displayed texts, or the character texture atlas may be divided into several sub-atlases to reduce a size of the character texture atlas loaded each time, which will not be described in detail here. It can be understood that an origin of each texture is set as a lower left vertex of an outline of the texture in this example, while in practice, the origin of the texture may be set to any point in the character texture atlas, which is not limited in the present disclosure.

In some embodiments, the action of obtaining the character texture of the to-be-displayed character from the character texture atlas includes: obtaining, from the character mapping relationship table, a position of the to-bedisplayed character in the character texture atlas; and obtaining a texture of the to-be-displayed character from the character texture atlas based on the position.

In the above optional embodiments, the to-be-displayed character is converted to a code form corresponding to a key in the character mapping relationship table. For example, the character of the first type is converted to a form of a Unicode. A texture position corresponding to the Unicode is queried. The texture of the to-be-displayed character is obtained from the character texture atlas based on the texture position.

Taking the example in FIG. 6 as an example, the to-be-displayed character is "名". The character "名" is converted to Unicode 540D corresponding thereto. A texture position corresponding to 540D is queried in the character mapping relationship table: origin: (0,47); outline: [(0,24), (23,24), (0,47), (23,47)]. A texture corresponding to the character "名" is obtained from the character texture atlas 603 by using the texture position. The outline represents an outline of the character. A height and a width of the outline of the character can be calculated based on coordinates of vertices of the outline.

After the texture of the to-be-displayed character is obtained, the origin of the texture of the to-be-displayed character is matched to the display origin based on the type of the to-be-displayed character, and the texture is drawn on a display screen.

In some embodiments, the second manner is to display the texture of the to-be-displayed character at the display origin of the character after rotating the texture of the to-be-displayed character by a predetermined angle. The predetermined angle is added in a calculation process of the display origin of the to-be-displayed character. For example, in the calculation of the actions at blocks S501 to S504, the predetermined angle of the to-be-displayed character is 90°.

It can be understood that an order of execution of the actions at blocks S104 and S105 is based on an order of arrangement of to-be-displayed characters; or the actions at blocks S104 and S105 may alternatively be executed in parallel, which will not be described in detail here.

With the above character display method, characters in a to-be-displayed text are divided into different types of characters, and a different type of characters is displayed in different manner based on the display parameter and the display manner under the premise of satisfying unified typesetting, allowing flexible control of typesetting of characters drawn on the screen.

Figure 7B:
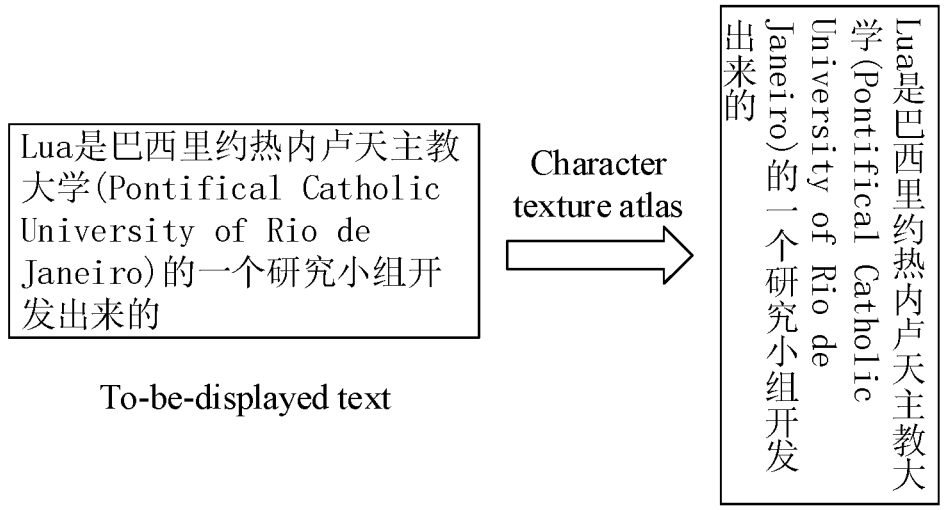

As illustrated in FIG. 7a, which is a schematic diagram of converting the to-be-displayed text into a corresponding character texture atlas using the method according to an embodiment of the present disclosure. Characters in the character texture atlas are de-duplicated textures. FIG. 7b is a schematic diagram of leftward vertical typesetting of the to-be-displayed text according to an embodiment of the present disclosure, in which English is displayed after being rotated by 90° in a clockwise direction.

The above embodiments discloses a character display method, including: obtaining a to-be-displayed character; determining a type of the to-be-displayed character; determining a display origin of the to-be-displayed character based on the type of the to-be-displayed character; displaying, at the display origin of the to-be-displayed character, the to-be-displayed character in a first manner in response to the to-be-displayed character being of a first type; and displaying, at the display origin of the to-be-displayed character, the to-be-displayed character in a second manner in response to the to-be-displayed character being of a second type. With the above method, by determining the types of to-be-displayed characters, characters of different types are displayed in different manners. Therefore, it is possible to display the to-be-displayed characters in different manners under unified typesetting, which solves a technical problem of inflexible control of character drawing in the related art.

In the above description, although the steps in the above method embodiments are described in the above sequence, it should be clear to those skilled in the art that the steps in the embodiments of the present disclosure are not necessarily performed in the above sequence. Instead, they can also be performed in other sequences such as a reverse sequence, a parallel sequence, a cross sequence, etc. Moreover, based on the above steps, those skilled in the art can also add other steps. These obvious variants or equivalent replacements shall also fall within the protection scope of the present disclosure, and thus details thereof will be omitted here.

Figure 8:
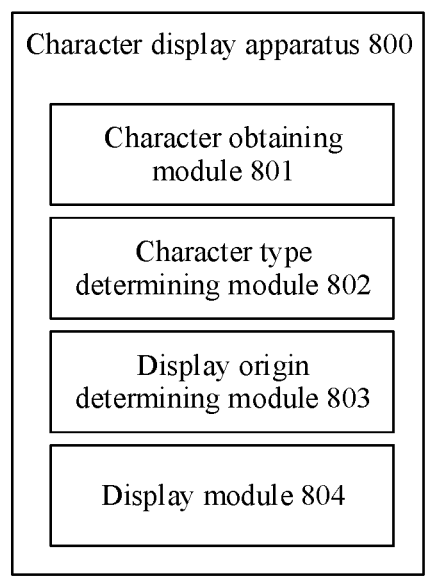
FIG. 8 is a schematic diagram showing a structure of a character display apparatus according to an embodiment of the present disclosure.

FIG. 8 is a schematic diagram showing a structure of a character display apparatus 800 according to an embodiment of the present disclosure. The character display apparatus 800 includes: a character obtaining module 801, a character type determining module 802, a display origin determining module 803, and a display module 804.

The character obtaining module 801 is configured to obtain a to-be-displayed character.

The character type determining module 802 is configured to determine a type of the to-be-displayed character.

The display origin determining module 803 is configured to determine a display origin of the to-be-displayed character based on the type of the to-be-displayed character.

The display module 804 is configured to display, at the display origin of the to-be-displayed character, the to-be-displayed character in a first manner in response to the to-be-displayed character being of a first type, and display, at the display origin of the to-be-displayed character, the to-be-displayed character in a second manner in response to the to-be-displayed character being of a second type.

In some embodiments, the character obtaining module 801 is further configured to: obtain a to-be-displayed text; and split characters in the to-be-displayed text to obtain at least one to-be-displayed character.

In some embodiments, the character obtaining module 801 is further configured to: obtain a first code of the to-be-displayed text; and split the to-be-displayed text based on the first code to obtain the to-be-displayed character.

In some embodiments, the character type determining module 802 is further configured to: obtain a first code of the to-be-displayed character; and determine the type of the to-be-displayed character to be the first type or the second type based on the first code of the to-be-displayed character.

In some embodiments, the character display apparatus 800 is further configured to: store, in a first queue, the to-be-displayed character in response to the to-be-displayed character being of the first type; and in response to the to-be-displayed character being of the second type, make up a word using consecutive to-be-displayed characters, and storing the word in a second queue.

In some embodiments, the display origin determining module 803 is further configured to: obtain a position of an initial display origin, wherein the position of the initial display origin is a display position of a first to-be-displayed character on a screen; and determine a position of the display origin of the to-be-displayed character based on the position of the initial display origin and a display parameter.

In some embodiments, the display origin determining module 803 is further configured to: determine the display origin of the to-be-displayed character based on a type of a previous character, a display origin of the previous character, the display parameter, and the type of the to-be-displayed character.

In some embodiments, the display parameter includes an outline width of a character, a character spacing, and an outline height of the character. The display origin determining module 803 is further configured to: calculate, in response to the previous character and the to-be-displayed character being of the first type, coordinates of the display origin of the to-be-displayed character based on coordinates of the display origin of the previous character, an outline height of the to-be-displayed character, and the character spacing; calculate, in response to the previous character being of the second type and the to-be-displayed character being of the first type, the coordinates of the display origin of the to-be-displayed character based on the coordinates of the display origin of the previous character, an outline width of the previous character, the outline height of the to-be-displayed character, and the character spacing; calculate, in response to the previous character being of the first type and the to-be-displayed character being of the second type, the coordinates of the display origin of the to-be-displayed character based on the coordinates of the display origin of the previous character and the character spacing; and calculate, in response to the previous character and the to-be-displayed character being of the second type, the coordinates of the display origin of the to-be-displayed character based on the coordinates of the display origin of the previous character, the outline width of the previous character, and the character spacing.

In some embodiments, the character display apparatus 800 is further configured to: re-determine, in response to a position of a lower border of the to-be-displayed character exceeding a maximum threshold, the position of the display origin of the to-be-displayed character based on the type of the to-be-displayed character, a display position of the previous character, and the display parameter.

In some embodiments, the character display apparatus 800 is further configured to: calculate, in response to the to-be-displayed character being of the first type or being a first character in a word made up by characters of the second type, coordinates of the display origin of the to-be-displayed character based on coordinates of the display origin of the previous character, a font size, and a line spacing; and in response to the to-be-displayed character being of the second type and not being a first character in a word made up by characters of the second type, set the to-be-displayed character as the first character in the word, and calculate the coordinates of the display origin of the to-be-displayed character based on coordinates of a display origin of a previous character of the first character, the font size, and the line spacing.

In some embodiments, the character display apparatus 800 can be configured to, during setting the to-be-displayed character as the first character in the word: set an index of the to-be-displayed character as an index of the first character in the word.

In some embodiments, the character obtaining module 801 is further configured to: split a to-be-displayed text to obtain each to-be-displayed character, setting an index for each to-be-displayed character, and index and store in an index list each to-be-displayed character in accordance with an order of the to-be-displayed character in the to-be-displayed text.

In some embodiments, the display origin determining module 803 is further configured to: identify a display origin of each to-be-displayed character by starting from a to-be-displayed character having an index of 0; set, in response to the index of the to-be-displayed character being 0, i.e., the to-be-displayed character being a first character in the to-be-displayed text, the display origin of the to-be-displayed character on the screen as the initial display origin; or determine, in response to the index of the to-be-displayed character not being 0, the display origin of the to-be-displayed character based on the type of the previous character, the display origin of the previous character, the display parameter, and the type of the to-be-displayed character.

In some embodiments, the character display apparatus 800 is further configured to: obtain a character texture of the to-be-displayed character from a character texture atlas. The first manner is to display the character texture at a position of the display origin of the to-be-displayed character. The second manner is to display the character texture at the position of the display origin of the to-be-displayed character after rotating the character texture by a predetermined angle.

In some embodiments, the character texture atlas is generated by: obtaining a single character; generating a texture of the single character based on a font attribute of the single character in response to an absence of the single character in the character texture atlas; and drawing the texture into the character texture atlas.

In some embodiments, the character display apparatus 800 is further configured to, during the obtaining of the single character: obtain the single character from an index list in order, the index list being used to index, after the single character is obtained by splitting a to-be-displayed text, the single character in accordance with an order of the single character in the to-be-displayed text, and store the single character; check whether the single character is already included in a character mapping relationship table; and in response to the single character being already included in the character mapping relationship table, obtain a next single character from the index list and check whether the next single character is already included in the character mapping relationship table until the single character is not included in the character mapping relationship table. The character mapping relationship table saves a correspondence between single characters and textures in the character texture atlas.

In some embodiments, the character display apparatus 800 is further configured to, during the obtaining of the character texture of the to-be-displayed character from the character texture atlas: obtain, from the character mapping relationship table, a position of the to-be-displayed character in the character texture atlas; and obtain a texture of the to-be-displayed character from the character texture atlas based on the position.

The apparatus illustrated in FIG. 8 may execute the method according to the embodiments illustrated in FIG. 1 to FIG. 6. Reference can be made to the relevant description of the embodiments illustrated in FIG. 1 to FIG. 6 for the parts not described in detail in this embodiment. For execution processes and technical effects of this technical solution, reference may be made to the description of the embodiments illustrated in FIG. 1 to FIG. 6, and thus details thereof will be omitted here.

Figure 9:
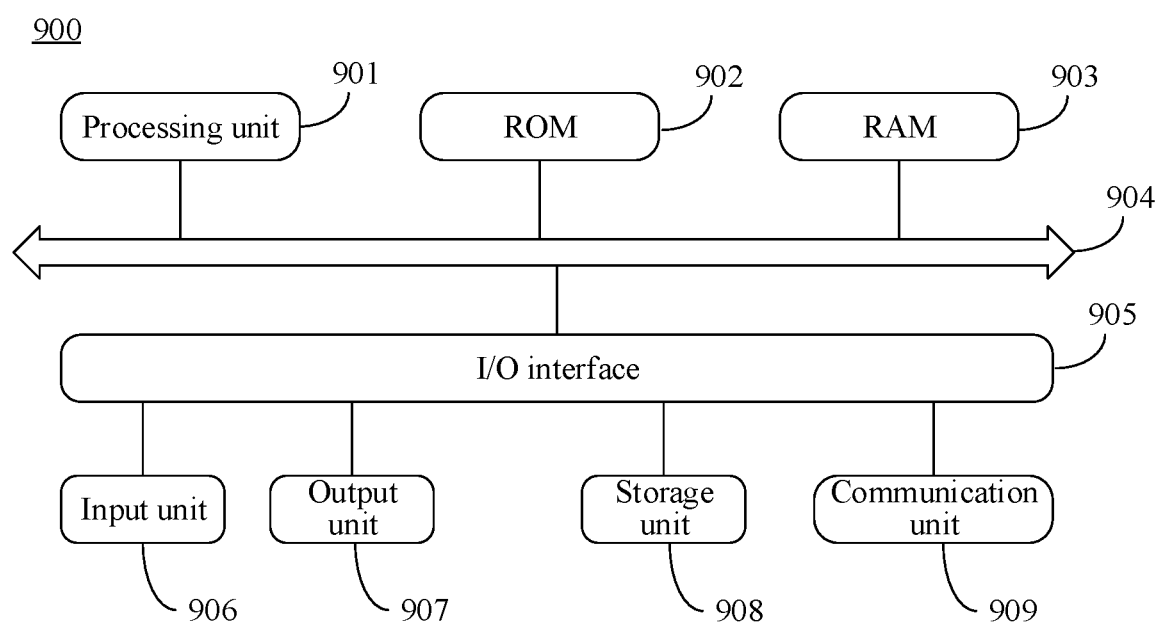
FIG. 9 is a schematic diagram showing a structure of an electronic device according to an embodiment of the present disclosure.

Reference is now made to FIG. 9, which is a schematic diagram showing a structure of an electronic device 900 (e.g., a terminal device or a server) adapted to implement the embodiments of the present disclosure. The terminal device according to the embodiment of the present disclosure may include, but is not limited to, a mobile terminal such as a mobile phone, a laptop computer, a digital broadcast receiver, a personal digital assistant (PDA), a tablet computer or PAD, a Portable Multimedia Player (PMP), a vehicle-mounted terminal (e.g., a vehicle-mounted navigation terminal), a wearable device, etc., or a fixed terminal such as a digital TV, a desktop computer, a smart home device, etc. The electronic device illustrated in FIG. 9 is exemplary only, and should not be construed as limiting the function and scope of use of the embodiments of the present disclosure.

As illustrated in FIG. 9, the electronic device 900 may include a processing unit (such as a central processing unit, a graphics processing unit, etc.) 901, which may perform various appropriate actions and processing in accordance with programs stored in a Read-Only Memory (ROM) 902 or loaded from a storage unit 908 into a Random Access Memory (RAM) 903, to implement the method according to the embodiments of the present disclosure. In the RAM 903, various programs and data required for operation of the electronic device 900 may also be stored. The processing unit 901, the ROM 902, and the RAM 903 are connected to each other through a bus 904. An Input/Output (I/O) interface 905 is also connected to the bus 904.

Generally, the following units may be connected to the I/O interface 905: an input unit 906 including, for example, a touch screen, a touch pad, a keyboard, a mouse, a camera, a microphone, an accelerometer, a gyroscope, etc.; an output unit 907 including, for example, a Liquid Crystal Display (LCD), a speaker, an oscillator, etc.; the storage unit 908 including, for example, a magnetic tape, a hard disk, etc.; and a communication unit 909. The communication unit 909 may allow the electronic device 900 to perform wireless or wired communication with other devices for data exchange. Although FIG. 9 illustrates the electronic device 900 having various units, it can be appreciated that it is not necessary to implement or provide all the illustrated units. Alternatively, more or fewer units may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a non-transitory computer-readable medium. The computer program includes program codes for implementing the method illustrated in the flowchart. In these embodiments, the computer program may be downloaded and installed from a network through the communication unit 909, or installed from the storage unit 908, or installed from the ROM 902. When the computer program is executed by the processing unit 901, the above-mentioned functions defined in the method according to the embodiments of the present disclosure are performed.

It should be noted that in the present disclosure, the above-mentioned computer-readable medium may be a computer-readable signal medium or a computer-readable storage medium or any combination thereof. The computer-readable storage medium may be, but is not limited to, for example, an electrical, magnetic, optical, electromagnetic, infrared, or semiconductor system, apparatus, or device, or any combination thereof. More specific examples of the computer-readable storage medium may include, but are not limited to: an electrical connection having one or more wires, a portable computer disk, a hard disk, an RAM, an ROM, an Electrical Programmable Read-Only Memory (EPROM) or a flash memory, an optical fiber, a Compact Disc ROM (CD-ROM), an optical storage device, a magnetic storage device, or any suitable combination thereof. In the present disclosure, the computer-readable storage medium may be any tangible medium including or storing programs which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, and may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server may communicate using any currently-known or future-developed network protocol, such as HTTP (HyperText Transfer Protocol), and may be in interconnection with digital data communication in any form or medium (e.g., a communication network). Examples of communication networks include a Local Area Network ("LAN"), a Wide Area Network ("WAN"), the Internet work (e.g., the Internet), and an end-to-end network (e.g., ad hoc end-to-end network), as well as any currently-known or future-developed network.

The above computer-readable medium may be included in the above electronic device, or may be standalone without being assembled into the electronic device.

The above computer-readable medium carries one or more programs which, when executed by the electronic device, cause the terminal device to perform the above character display method.

The computer program codes for implementing the operations of the present disclosure may be written in one or more programming languages or any combination thereof. The programming languages may include, but are not limited to, object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any type of network, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure can be implemented in software or hardware. Here, a name of a unit does not constitute a limitation on the unit itself under certain circumstances.

The functions described above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection having one or more wires, a portable computer disk, a hard disk, an RAM, an ROM, an EPROM or a flash memory, an optical fiber, a CD-ROM, an optical storage device, a magnetic storage device, or any suitable combination thereof.

According to one or more embodiments of the present disclosure, an electronic device is provided. The electronic device includes: at least one processor; and a memory in a communication connection to the at least one processor. The memory has instructions executable by the at least one processor stored thereon. The instructions, when executed by the at least one processor, cause the at least one processor to perform the character display method described in any of the above implementations.

According to one or more embodiments of the present disclosure, a non-transitory computer-readable storage medium is provided. The non-transitory computer-readable storage medium has computer instructions stored thereon. The computer instructions are configured to cause a computer to perform the character display method described in any of the above implementations.

The above description is only intended to explain the preferred embodiments of the present disclosure and the employed principles of technology. It will be appreciated by those skilled in the art that the scope of the present disclosure is not limited to the technical solutions formed by the specific combinations of the above technical features, but should also encompass other technical solutions formed by any other combinations of features described above or equivalents thereof without departing from the above concepts of the present disclosure, for example, technical solutions formed by replacement of the above features with the technical features disclosed in (but not limited thereto) the present disclosure having similar functions.

What is claimed is:

1. A character display method, performed by an electronic device having a screen, comprising:
   obtaining a to-be-displayed character to be displayed on the screen;
   determining a type of the to-be-displayed character;
   determining a display origin of the to-be-displayed character on the screen based on the type of the to-be-displayed character;
   displaying, at the display origin of the to-be-displayed character on the screen, the to-be-displayed character in a first manner in response to the to-be-displayed character being of a first type; and
   displaying, at the display origin of the to-be-displayed character on the screen, the to-be-displayed character in a second manner in response to the to-be-displayed character being of a second type,
   wherein said determining the display origin of the to-be-displayed character on the screen based on the type of the to-be-displayed character comprises:
   obtaining a position of an initial display origin, wherein the position of the initial display origin is a display position of a first to-be-displayed character on the screen; and
   determining a position of the display origin of the to-be-displayed character based on the position of the initial display origin and a display parameter,
   wherein said determining the position of the display origin of the to-be-displayed character based on the position of the initial display origin and the display parameter comprises:
   determining the display origin of the to-be-displayed character based on a type of a previous character, a display origin of the previous character, the display parameter, and the type of the to-be-displayed character,
   wherein:
   the display parameter comprises an outline width of a character, a character spacing, and an outline height of the character; and
   said determining the display origin of the to-be-displayed character based on the type of the previous character, the display origin of the previous character, the display parameter, and the type of the to-be-displayed character comprises:
   calculating, in response to the previous character and the to-be-displayed character being of the first type, coordinates of the display origin of the to-be-displayed character based on coordinates of the display origin of the previous character, an outline height of the to-be-displayed character, and the character spacing;
   calculating, in response to the previous character being of the second type and the to-be-displayed character being of the first type, the coordinates of the display origin of the to-be-displayed character based on the coordinates of the display origin of the previous character, an outline width of the previous character, the outline height of the to-be-displayed character, and the character spacing;
   calculating, in response to the previous character being of the first type and the to-be-displayed character being of the second type, the coordinates of the display origin of the to-be-displayed character based on the coordinates of the display origin of the previous character and the character spacing; and
   calculating, in response to the previous character and the to-be-displayed character being of the second type, the coordinates of the display origin of the to-be-displayed character based on the coordinates of the display origin of the previous character, the outline width of the previous character, and the character spacing.

2. The character display method according to claim 1, wherein said obtaining the to-be-displayed character to be displayed on the screen comprises:
obtaining a to-be-displayed text; and
splitting characters in the to-be-displayed text to obtain at least one to-be-displayed character.

3. The character display method according to claim 2, wherein said splitting the characters in the to-be-displayed text to obtain the at least one to-be-displayed character comprises:
obtaining a first code of the to-be-displayed text; and
splitting the to-be-displayed text based on the first code to obtain the to-be-displayed character.

4. The character display method according to claim 1, wherein said determining the type of the to-be-displayed character comprises:
obtaining a first code of the to-be-displayed character; and
determining the type of the to-be-displayed character to be the first type or the second type based on the first code of the to-be-displayed character.

5. The character display method according to claim 1, further comprising, subsequent to said determining the type of the to-be-displayed character:
storing, in a first queue, the to-be-displayed character in response to the to-be-displayed character being of the first type; and
in response to the to-be-displayed character being of the second type, making up a word using consecutive to-be-displayed characters, and storing the word in a second queue.

6. The character display method according to claim 1, further comprising:
re-determining the position of the display origin of the to-be-displayed character based on the type of the to-be-displayed character, a display position of the previous character, and the display parameter in response to a position of a lower border of the to-be-displayed character exceeding a maximum threshold.

7. The character display method according to claim 6, wherein said re-determining the position of the display origin of the to-be-displayed character based on the type of the to-be-displayed character, the display position of the previous character, and the display parameter comprises:
calculating coordinates of the display origin of the to-be-displayed character based on coordinates of the display origin of the previous character, a font size, and a line spacing in response to the to-be-displayed character being of the first type or being a first character in a word made up by characters of the second type; and
in response to the to-be-displayed character being of the second type and not being a first character in a word made up by characters of the second type, setting the to-be-displayed character as the first character in the word, and calculating the coordinates of the display origin of the to-be-displayed character based on coordinates of a display origin of a previous character of the first character, the font size, and the line spacing.

8. The character display method according to claim 7, wherein said setting the to-be-displayed character as the first character in the word comprises:
setting an index of the to-be-displayed character as an index of the first character in the word.

9. The character display method according to claim 1, further comprising, during the obtaining of the to-be-displayed character:
splitting a to-be-displayed text to obtain each to-be-displayed character, setting an index for each to-be-displayed character, and indexing and storing in an index list each to-be-displayed character in accordance with an order of the to-be-displayed character in the to-be-displayed text.

10. The character display method according to claim 9, wherein said determining the position of the display origin of the to-be-displayed character based on the position of the initial display origin and the display parameter comprises:
identifying a display origin of each to-be-displayed character by starting from a to-be-displayed character having an index of 0;
setting, in response to the index of the to-be-displayed character being 0, i.e., the to-be-displayed character being a first character in the to-be-displayed text, the display origin of the to-be-displayed character on the screen as the initial display origin; or
determining, in response to the index of the to-be-displayed character not being 0, the display origin of the to-be-displayed character based on the type of the previous character, the display origin of the previous character, the display parameter, and the type of the to-be-displayed character.

11. The character display method according to claim 1, further comprising, subsequent to said determining the display origin of the to-be-displayed character on the screen based on the type of the to-be-displayed character:
obtaining a character texture of the to-be-displayed character from a character texture atlas, wherein:
the first manner is to display the character texture at a position of the display origin of the to-be-displayed character; and
the second manner is to display the character texture at the position of the display origin of the to-be-displayed character after rotating the character texture by a predetermined angle.

12. The character display method according to claim 11, wherein the character texture atlas is generated by:
obtaining a single character;
generating a texture of the single character based on a font attribute of the single character in response to an absence of the single character in the character texture atlas; and
drawing the texture into the character texture atlas.

13. The character display method according to claim 12, wherein said obtaining the single character comprises:
obtaining the single character from an index list in order, the index list being used to index, after the single character is obtained by splitting a to-be-displayed text, the single character in accordance with an order of the single character in the to-be-displayed text, and store the single character;
checking whether the single character is already included in a character mapping relationship table; and
obtaining, in response to the single character being already included in the character mapping relationship table, a next single character from the index list and checking whether the next single character is already included in the character mapping relationship table until the single character is not included in the character mapping relationship table, wherein the character mapping relationship table saves a correspondence between single characters and textures in the character texture atlas.

14. The character display method according to claim 13, wherein said obtaining the character texture of the to-be-displayed character from the character texture atlas comprises:
obtaining, from the character mapping relationship table, a position of the to-be-displayed character in the character texture atlas; and
obtaining the texture of the to-be-displayed character from the character texture atlas based on the position.

15. An electronic device, comprising:
a screen;
a memory having computer-readable instructions stored thereon; and
a processor configured to execute the computer-readable instructions to perform following operations:
obtaining a to-be-displayed character to be displayed on the screen;
determining a type of the to-be-displayed character;
determining a display origin of the to-be-displayed character on the screen based on the type of the to-be-displayed character;
displaying, at the display origin of the to-be-displayed character on the screen, the to-be-displayed character in a first manner in response to the to-be-displayed character being of a first type; and
displaying, at the display origin of the to-be-displayed character on the screen, the to-be-displayed character in a second manner in response to the to-be-displayed character being of a second type,
wherein said determining the display origin of the to-be-displayed character on the screen based on the type of the to-be-displayed character comprises:
obtaining a position of an initial display origin, wherein the position of the initial display origin is a display position of a first to-be-displayed character on the screen; and
determining a position of the display origin of the to-be-displayed character based on the position of the initial display origin and a display parameter,
wherein said determining the position of the display origin of the to-be-displayed character based on the position of the initial display origin and the display parameter comprises:
determining the display origin of the to-be-displayed character based on a type of a previous character, a display origin of the previous character, the display parameter, and the type of the to-be-displayed character,
wherein:
the display parameter comprises an outline width of a character, a character spacing, and an outline height of the character; and
said determining the display origin of the to-be-displayed character based on the type of the previous character, the display origin of the previous character, the display parameter, and the type of the to-be-displayed character comprises:
calculating, in response to the previous character and the to-be-displayed character being of the first type, coordinates of the display origin of the to-be-displayed character based on coordinates of the display origin of the previous character, an outline height of the to-be-displayed character, and the character spacing;

calculating, in response to the previous character being of the second type and the to-be-displayed character being of the first type, the coordinates of the display origin of the to-be-displayed character based on the coordinates of the display origin of the previous character, an outline width of the previous character, the outline height of the to-be-displayed character, and the character spacing;
calculating, in response to the previous character being of the first type and the to-be-displayed character being of the second type, the coordinates of the display origin of the to-be-displayed character based on the coordinates of the display origin of the previous character and the character spacing; and
calculating, in response to the previous character and the to-be-displayed character being of the second type, the coordinates of the display origin of the to-be-displayed character based on the coordinates of the display origin of the previous character, the outline width of the previous character, and the character spacing.

16. The electronic device according to claim 15, wherein said obtaining the to-be-displayed character to be displayed on the screen comprises:
obtaining a to-be-displayed text; and
splitting characters in the to-be-displayed text to obtain at least one to-be-displayed character.

17. A non-transitory computer-readable storage medium, having computer-readable instructions stored thereon, wherein the computer-readable instructions, when executed by a computer, cause the computer to perform following operations:
obtaining a to-be-displayed character to be displayed on a screen of an electronic device;
determining a type of the to-be-displayed character;
determining a display origin of the to-be-displayed character on the screen based on the type of the to-be-displayed character;
displaying, at the display origin of the to-be-displayed character on the screen, the to-be-displayed character in a first manner in response to the to-be-displayed character being of a first type; and
displaying, at the display origin of the to-be-displayed character on the screen, the to-be-displayed character in a second manner in response to the to-be-displayed character being of a second type,
wherein said determining the display origin of the to-be-displayed character on the screen based on the type of the to-be-displayed character comprises:
obtaining a position of an initial display origin, wherein the position of the initial display origin is a display position of a first to-be-displayed character on the screen; and
determining a position of the display origin of the to-be-displayed character based on the position of the initial display origin and a display parameter,
wherein said determining the position of the display origin of the to-be-displayed character based on the position of the initial display origin and the display parameter comprises:
determining the display origin of the to-be-displayed character based on a type of a previous character, a display origin of the previous character, the display parameter, and the type of the to-be-displayed character,
wherein:

the display parameter comprises an outline width of a character, a character spacing, and an outline height of the character; and said determining the display origin of the to-be-displayed character based on the type of the previous character, the display origin of the previous character, the display parameter, and the type of the to-be-displayed character comprises:

calculating, in response to the previous character and the to-be-displayed character being of the first type, coordinates of the display origin of the to-be-displayed character based on coordinates of the display origin of the previous character, an outline height of the to-be-displayed character, and the character spacing;

calculating, in response to the previous character being of the second type and the to-be-displayed character being of the first type, the coordinates of the display origin of the to-be-displayed character based on the coordinates of the display origin of the previous character, an outline width of the previous character, the outline height of the to-be-displayed character, and the character spacing;

calculating, in response to the previous character being of the first type and the to-be-displayed character being of the second type, the coordinates of the display origin of the to-be-displayed character based on the coordinates of the display origin of the previous character and the character spacing; and calculating, in response to the previous character and the to-be-displayed character being of the second type, the coordinates of the display origin of the to-be-displayed character based on the coordinates of the display origin of the previous character, the outline width of the previous character, and the character spacing.

* * * * *